United States Patent
Iwamoto et al.

(10) Patent No.: US 11,067,205 B2
(45) Date of Patent: Jul. 20, 2021

(54) THREADED CONNECTION FOR STEEL PIPE

(71) Applicant: Nippon Steel Corporation, Tokyo (JP)

(72) Inventors: Michihiko Iwamoto, Tokyo (JP); Yusuke Takeda, Tokyo (JP); Yasuhiro Kochi, Tokyo (JP); Satoshi Maruta, Tokyo (JP); Yusuke Toyota, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 158 days.

(21) Appl. No.: 16/495,420

(22) PCT Filed: Mar. 2, 2018

(86) PCT No.: PCT/JP2018/008155
§ 371 (c)(1),
(2) Date: Sep. 19, 2019

(87) PCT Pub. No.: WO2018/180218
PCT Pub. Date: Oct. 4, 2018

(65) Prior Publication Data
US 2020/0025315 A1 Jan. 23, 2020

(30) Foreign Application Priority Data
Mar. 31, 2017 (JP) .............................. JP2017-070649

(51) Int. Cl.
*F16L 15/06* (2006.01)
*F16L 15/04* (2006.01)
*E21B 17/042* (2006.01)

(52) U.S. Cl.
CPC ............... *F16L 15/06* (2013.01); *F16L 15/04* (2013.01); *E21B 17/042* (2013.01)

(58) Field of Classification Search
CPC ................................ F16L 15/06; F16L 15/004
(Continued)

(56) References Cited

U.S. PATENT DOCUMENTS 4,549,754 A * 10/1985 Saunders ................ F16L 15/06
285/334
4,865,364 A * 9/1989 Nobileau .............. F16L 15/003
285/334
(Continued)

FOREIGN PATENT DOCUMENTS

EP 0147358 A2 7/1985
EP 2420646 A1 * 2/2012 .............. F16L 15/06
(Continued)

OTHER PUBLICATIONS

English Abstract & Family List of JP2008256023A.
(Continued)

*Primary Examiner* — David Bochna
(74) *Attorney, Agent, or Firm* — Banner & Witcoff, Ltd.

(57) ABSTRACT

A threaded connection for steel pipe is provided that prevents cross-threading and provides good compression load resistance. A threaded connection (10) includes a pin (30) and a box (40). The male thread stabbing flank (34) of the pin (30) includes two male thread stabbing flank portions (341) and (342). The male thread stabbing flank portion (341) is located farther from the pipe axis (X) of the steel pipe (20) and has a stabbing flank angle (α1) of −10 to 15 degrees. The male thread stabbing flank portion (342) is located closer to the pipe axis (X) and has a stabbing flank angle (α2) of 20 to 60 degrees. The female thread stabbing flank (44) of the box (40) includes two female thread stabbing flank portions (441) and (442). The female thread stabbing flank portion (441) is located farther from the pipe axis (X) and has a stabbing flank angle (α1) equal to the stabbing flank angle (α1) of the male thread stabbing flank portion (341). The female thread stabbing flank portion (442) is located closer to the pipe axis (X) and has a stabbing
(Continued)

flank angle (α2) equal to the stabbing flank angle (α2) of the male thread stabbing flank portion (342).

15 Claims, 13 Drawing Sheets

(58) Field of Classification Search
USPC .......................................................... 285/334
See application file for complete search history.

(56) References Cited

U.S. PATENT DOCUMENTS

| | | | | |
|---|---|---|---|---|
| 5,782,503 | A * | 7/1998 | Noel | F16L 15/001 |
| | | | | 285/334 |
| 6,543,816 | B1 | 4/2003 | Noel | |
| 7,416,374 | B2 * | 8/2008 | Breihan | F16B 33/02 |
| | | | | 285/334 |
| 8,668,232 | B2 * | 3/2014 | Mazzaferro | F16L 15/06 |
| | | | | 285/334 |
| 9,874,058 | B2 * | 1/2018 | Benedict | E21B 17/042 |
| 2004/0026924 | A1 * | 2/2004 | Kessler | F16L 15/004 |
| | | | | 285/334 |
| 2004/0195835 | A1 * | 10/2004 | Noel | F16L 15/06 |
| | | | | 285/334 |
| 2008/0012321 | A1 * | 1/2008 | Roussie | F16L 15/002 |
| | | | | 285/334 |
| 2010/0078936 | A1 | 4/2010 | Nakamura et al. | |
| 2011/0012349 | A1 | 1/2011 | Church | |
| 2011/0101684 | A1 | 5/2011 | Leng | |
| 2012/0104751 | A1 | 5/2012 | Nunez | |
| 2012/0298249 | A1 * | 11/2012 | Banker | F16L 15/06 |
| | | | | 285/334 |
| 2016/0312931 | A1 | 10/2016 | Martin et al. | |
| 2017/0292638 | A1 | 10/2017 | Sugino et al. | |

FOREIGN PATENT DOCUMENTS

| | | |
|---|---|---|
| FR | 2800150 A1 | 4/2001 |
| JP | H08303657 A | 11/1996 |
| JP | H11132370 A | 5/1999 |
| JP | 2002061780 A | 2/2002 |
| JP | 2008256023 A | 10/2008 |
| JP | 2015092109 A | 5/2015 |
| WO | 2016/056222 A1 | 4/2016 |

OTHER PUBLICATIONS

English Abstract & Family List of JPH08303657A.
English Abstract & Family List of WO2016056222.
English Abstract & Family List of US2011012349A1.
English Abstract & Family List of JPA2015092109.
English Abstract & Family List of JPA2002061780.
English Abstract & Family List of JPA1999132370.

* cited by examiner

PITCH DISPLACEMENT

THREADED CONNECTION FOR STEEL PIPE

RELATED APPLICATION DATA

This application is a National Stage Application under 35 U.S.C. 371 of co-pending PCT application number PCT/JP2018/008155 designating the United States and filed Mar. 2, 2018; which claims the benefit of JP application number 2017-070649 and filed Mar. 31, 2017 each of which are hereby incorporated by reference in their entireties.

BACKGROUND

Technical Field

The present disclosure relates to a threaded connection for steel pipe, and more particularly, to a threaded connection for connecting two steel pipes to each other.

Description of the Background Art

A Steel pipes called oil country tubular goods are used, for example, for prospecting and producing oil or natural gas in oil wells or natural gas wells (hereinafter collectively referred to as "oil well"), developing non-conventional resources such as oil sand or shale gas, retrieving or storing carbon dioxide (Carbon dioxide Capture and Storage (CCS)), geothermal power generation, or in hot springs. A threaded connection is used to connect steel pipes.

Such threaded connections for steel pipes are generally categorized as coupling-type and integral-type. A coupling-type connection connects a pair of pipes, one of which is a steel pipe and the other one is a coupling. In this case, a male thread is provided on the outer periphery of each of the ends of the steel pipe, while a female thread is provided on the inner periphery of each of the ends of the coupling. Then, the male thread of the steel pipe is screwed onto the female thread of the coupling such that they are made up and connected. An integral-type connection connects a pair of pipes that are both steel pipes, and does not use a separate coupling. In this case, a male thread is provided on the outer periphery of one end of each steel pipe, while a female thread is provided on the inner periphery of the other end. Then, the male thread of one steel pipe is screwed onto the female thread of the other steel pipe such that they are made up and connected.

A connection portion of a pipe end on which a male thread is provided includes an element to be inserted into a female thread, and thus is usually referred to as "pin". A connection portion of a pipe end on which a female thread is provided includes an element for receiving a male thread, and thus is referred to as "box". A pin and a box constitute ends of pipes and are thus tubular in shape.

An oil well is drilled along while its side wall is reinforced by oil country tubular goods to prevent the side wall from collapsing during drilling, which results in multiple oil country tubular goods arranged in one another. In recent years, both land and offshore wells have become deeper and deeper; in such environments, threaded connections in which the inner and outer diameters of the connection portions are generally the same as, or slightly larger than, the inner and outer diameters of the steel pipes are often used to connect oil country tubular goods, in order to develop oil wells efficiently. The use of such threaded connections minimizes the gaps between the oil country tubular goods arranged in one another, making it possible to efficiently develop a deep oil well without significantly increasing the diameter of the well. A threaded connection is required to have good sealing performance against a pressure fluid from the inside (hereinafter also referred to as "internal pressure") and a pressure fluid from the outside (hereinafter also referred to as "external pressure") under the above-described restrictions on the inner and outer diameters. Further, if oil country tubular goods are used in an oil well with great depth, for example, thermal expansion thereof may apply large tensile loads or compression loads to the threaded connections. In such environments, too, a threaded connection is required to have good sealing performance.

Known threaded connections that ensure sealing performance include those having a seal that uses a metal-to-metal contact (hereinafter referred to as "metal seal"). In a metal seal, the diameter of the sealing surface of the pin is slightly larger than the diameter of the sealing surface of the box (this difference in diameter will be referred to as "amount of interference"); when the threaded connection is made up and the sealing surfaces are made to fit together, the amount of interference reduces the diameter of the sealing surface of the pin while increasing the diameter of the sealing surface of the box; these sealing surfaces try to return to their respective original diameters, providing an elastic recovery which produces contact pressures on the sealing surfaces such that their entire peripheries adhere to each other, thereby providing sealing performance. Other known threaded connections that ensure sealing performance include those that, instead of or in addition to the use of a metal seal, provides sealing performance using the threaded assembly. More specifically, in a region of the made-up threaded assembly with a predetermined length or longer, the clearance between the thread surfaces of the pin and box is small and a viscous lubricant called dope is provided in this clearance, and the interference between the thread diameters of the pin and box produces contact surface pressures (this construction will be hereinafter referred to as "thread seal (construction)" on the thread surfaces. Threaded connections are also known that have such thread seals to provide sealing performance against the internal and external pressures.

Another performance required of a threaded connection is, for example, the ability to prevent cross-threading or galling during make-up, discussed further below. In this context, JP H08(1996)-303657 A, at paragraph 0041, states: "To facilitate introduction and removal of tools, it is preferable that the engaging flank or stabbing flank of a tooth of the male thread has an angle with a larger absolute value. This angle, relative to a plane perpendicular to the axis of the thread, may be about 10° to 45, for example. To help introduce the male element into the female housing without damaging a thread due to catching, it is preferable to provide an engaging flank with a certain angle in a maximum-diameter portion connected to the tip of a tooth of the male thread. Advantageously, the angle relative to a plane perpendicular to the axis of the thread is between 30° and 70°."

SUMMARY OF THE DISCLOSURE

The threaded connection disclosed by JP H08(1996)-303657 A has good performance. However, after an extensive research, the present inventors found out that further improvements would be possible in terms of the ability to prevent cross-threading and the performance exhibited when compression loads are being applied, as discussed further below.

An object of the present disclosure is to provide a threaded connection for steel pipe that prevents cross-threading and provides good compression load resistance.

A threaded connection for steel pipe according to the present disclosure includes a tubular pin and a tubular box. The pin is located on one end of the steel pipe. The pin is inserted into the box such that the box and pin are made up. The pin includes a male thread. The male thread is provided on an outer periphery of the pin. The box includes a female thread. The female thread corresponds to the male thread and is provided on an inner periphery of the box. The male thread and the female thread are trapezoidal threads and tapered threads. When the connection has been made up, at least a portion of the male thread and at least a portion of the female thread serve as a thread seal. The male thread includes a male thread crest, a male thread root, a male thread stabbing flank, and a male thread load flank. The male thread stabbing flank is located closer to a tip of the pin. The male thread load flank is located farther from the tip of the pin. The male thread stabbing flank includes a first male thread stabbing flank portion and a second male thread stabbing flank portion. The first male thread stabbing flank portion is located farther from a pipe axis of the steel pipe and has a stabbing flank angle of −10 to 15 degrees. The second male thread stabbing flank portion is located closer to the pipe axis and has a stabbing flank angle of 20 to 60 degrees. The second male thread stabbing flank portion has a height of 20 to 60% of that of the male thread. The female thread includes a female thread crest, a female thread root, a female thread stabbing flank, and a female thread load flank. The female thread crest faces the male thread root. The female thread root faces the male thread crest. The female thread stabbing flank faces the male thread stabbing flank. The female thread load flank faces the male thread load flank. The female thread stabbing flank includes a first female thread stabbing flank portion and a second female thread stabbing flank portion. The first female thread stabbing flank portion is located farther from the pipe axis and has a stabbing flank angle equal to the stabbing flank angle of the first male thread stabbing flank portion. The second female thread stabbing flank portion is located closer to the pipe axis and has a stabbing flank angle equal to the stabbing flank angle of the second male thread stabbing flank portion.

DETAILED DESCRIPTION OF THE PREFERRED EMBODIMENTS

Figure 1:
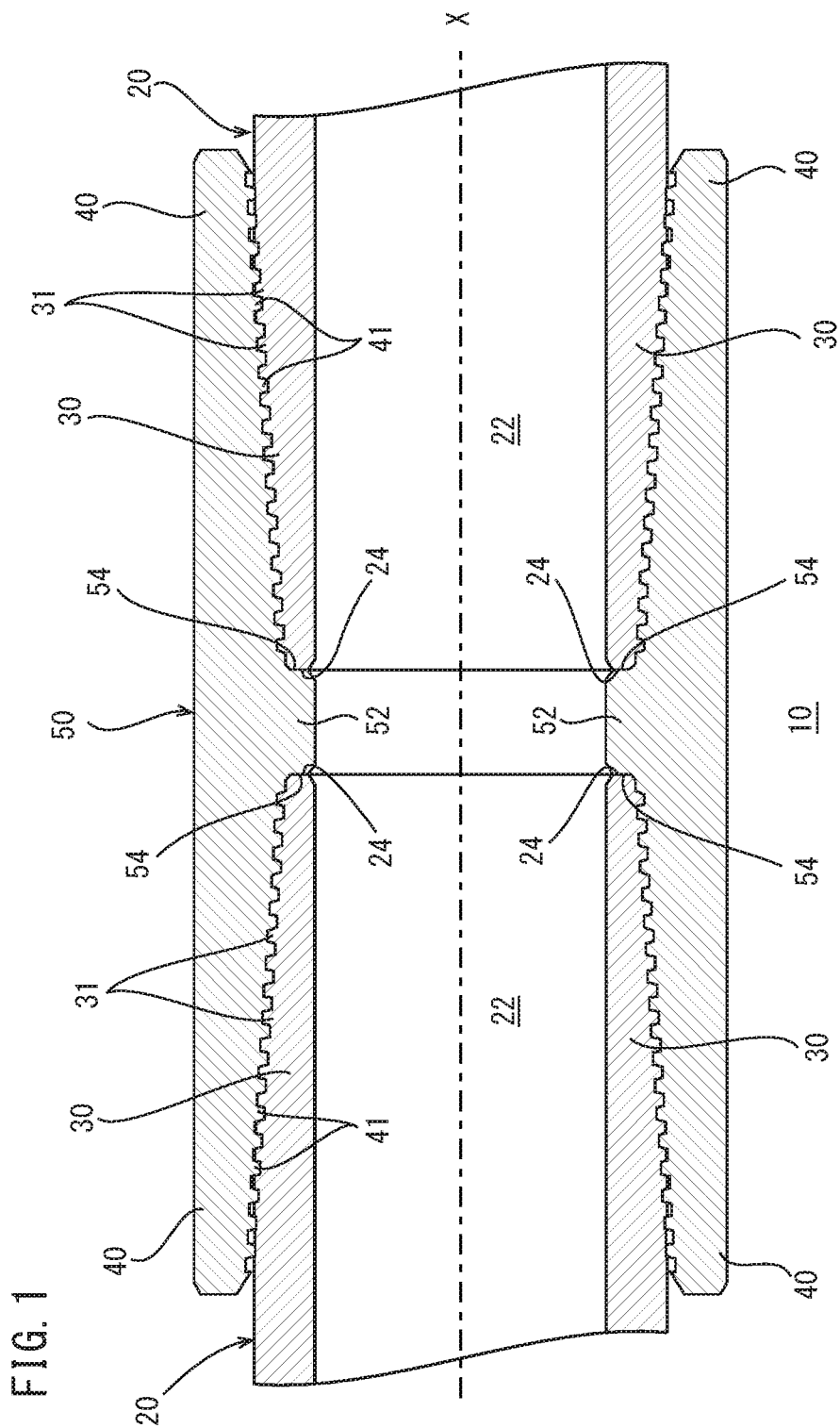
FIG. 1 is a longitudinal cross-sectional view of a threaded connection for steel pipe according to Embodiment 1, taken along the pipe-axis direction thereof.

A threaded connection for steel pipe according to the present embodiment is a threaded connection for connecting two steel pipes to each other. The present threaded connection includes a tubular pin and a tubular box. The pin is located on one end of the steel pipe. The pin is inserted into the box such that the box and pin are made up. The pin includes a male thread. The male thread is provided on an outer periphery of the pin. The box includes a female thread. The female thread corresponds to the male thread and is provided on an inner periphery of the box. The male thread and the female thread are trapezoidal threads and tapered threads. When the connection has been made up, at least a portion of the male thread and at least a portion of the female thread serve as a thread seal. The male thread includes a male thread crest, a male thread root, a male thread stabbing flank, and a male thread load flank. The male thread stabbing flank is located closer to a tip of the pin. The male thread load flank is located farther from the tip of the pin. The male thread stabbing flank includes a first male thread stabbing flank portion and a second male thread stabbing flank portion. The first male thread stabbing flank portion is located farther from a pipe axis of the steel pipe and has a stabbing flank angle of −10 to 15 degrees. The second male thread stabbing flank portion is located closer to the pipe axis and has a stabbing flank angle of 20 to 60 degrees. The second male thread stabbing flank portion has a height of 20 to 60% of that of the male thread. The female thread includes a female thread crest, a female thread root, a female thread stabbing flank, and a female thread load flank. The female thread crest faces the male thread root. The female thread root faces the male thread crest. The female thread stabbing flank faces the male thread stabbing flank. The female thread load flank faces the male thread load flank. The female thread stabbing flank includes a first female thread stabbing flank portion and a second female thread stabbing flank portion. The first female thread stabbing flank portion is located farther from the pipe axis and has a stabbing flank angle equal to the stabbing flank angle of the first male thread stabbing flank portion. The second female thread stabbing flank portion is located closer to the pipe axis and has a stabbing flank angle equal to the stabbing flank angle of the second male thread stabbing flank portion.

According to the above-described embodiment, the male thread stabbing flank includes a first male thread stabbing flank portion located farther from the pipe axis of the steel pipe and having a stabbing flank angle of −10 to 15 degrees and a portion located closer to the pipe axis and having a stabbing flank angle of 20 to 60 degrees, while the female thread stabbing flank includes a first female thread stabbing flank portion located farther from the pipe axis and having a stabbing flank angle equal to the stabbing flank angle of the first male thread stabbing flank portion and a second female thread stabbing flank portion located closer to the pipe axis and having a stabbing flank angle equal to the stabbing flank angle of the second male thread stabbing flank portion. This will prevent cross-threading and provide good compression load resistance.

The male thread further includes a first male thread round surface. The first male thread round surface is located on a corner between the male thread crest and the male thread stabbing flank. The female thread further includes a first female thread round surface. The first female thread round surface is located on a corner between the female thread crest and the female thread stabbing flank.

This will further prevent cross-threading.

The male thread further includes a second male thread round surface, a third male thread round surface, and a fourth male thread round surface. The second male thread round surface is located on a corner between the male thread crest and the male thread load flank. The third male thread round surface is located on a corner between the male thread root and the male thread stabbing flank. The forth male thread round surface is located on a corner between the male thread root and the male thread load flank. The female thread further includes a second female thread round surface, a third female thread round surface, and a fourth female thread round surface. The second female thread round surface is located on a corner between the female thread crest and the female thread load flank. The third female thread round surface is located on a corner between the female thread root and the female thread stabbing flank. The fourth female thread round surface is located on a corner between the female thread root and the female thread load flank.

This will further prevent cross-threading.

The male thread load flank has a load flank angle of −10 to 3 degrees. The female thread load flank has a load flank angle equal to the load flank angle of the male thread load flank.

This will improve tensile load resistance, preventing so-called jump-out.

The male thread crest, the male thread root, the female thread crest, and the female thread root are parallel to the pipe axis.

This will improve stab performance.

The male thread stabbing flank and the female thread stabbing flank have a clearance therebetween of 60 to 120 μm when the connection has been made up.

This will improve sealing performance and prevent galling.

The male thread crest and the female thread root have a clearance therebetween of 0 to 50 μm when the connection has been made up. The male thread root and the female thread crest have a clearance therebetween of 0 to 50 μm when the connection has been made up.

This will improve sealing performance.

The pin further includes a pin shoulder surface. The pin shoulder surface is located on the end of the pin. The box further includes a box shoulder surface. The box shoulder surface is in contact with the pin shoulder surface when the connection has been made up.

This will improve compression load resistance and enable controlling the amount of interference between the threads.

The male thread includes a tapered thread having a taper ratio decreasing as it goes away from the tip of the pin.

Thus, the contact pressure will gradually decrease as it goes away from the tip of the pin.

The pin further includes a pin sealing surface. The pin sealing surface is located between the tip of the pin and the male thread and on the outer periphery of the pin. The box further includes a box sealing surface. The box sealing surface faces the pin sealing surface and is located on the inner periphery of the box, and adheres to the pin sealing surface when the connection has been made up. The portions of the male thread and the female thread serving as the thread seal have a length as measured in a pipe-axis direction three times a wall thickness of the steel pipe or more.

This will improve sealing performance.

A threaded connection for steel pipe according to another embodiment is a threaded connection for connecting two steel pipes to each other. The present threaded connection includes a tubular first pin, a tubular second pin and a coupling. The first pin is located on an end of one pipe of the steel pipes. The second pin is located on an end of the other pipe of the steel pipes. The coupling includes a tubular first box and a tubular second box. The first pin is inserted into the first box such that the first box and first pin are made up. The second box is located opposite to the first box, and the second pin is inserted into the second box such that the second box and second pin are made up. Each of the first and second pins includes a male thread. The male thread is provided on an outer periphery of the pin. Each of the first and second boxes includes a female thread. The female thread corresponds to the male thread and is provided on an inner periphery of the box. The male thread and the female thread are trapezoidal threads and tapered threads. When the connection has been made up, at least a portion of the male thread and at least a portion of the female thread serve as a thread seal. The male thread includes a male thread crest, a male thread root, a male thread stabbing flank, and a male thread load flank. The male thread stabbing flank is located closer to a tip of the pin. The male thread load flank is located farther from the tip of the pin. The male thread stabbing flank includes a first male thread stabbing flank portion and a second male thread stabbing flank portion. The first male thread stabbing flank portion is located farther from a pipe axis of the steel pipe and has a stabbing flank angle of −10 to 15 degrees. The second male thread stabbing flank portion is located closer to the pipe axis and has a stabbing flank angle of 20 to 60 degrees. The second male thread stabbing flank portion has a height of 20 to 60% of that of the male thread. The female thread includes a female thread crest, a female thread root, a female thread stabbing flank, and a female thread load flank. The female thread crest faces the male thread root. The female thread root faces the male thread crest. The female thread stabbing flank faces the male thread stabbing flank. The female thread load flank faces the male thread load flank. The female thread stabbing flank includes a first female thread stabbing flank portion and a second female thread stabbing flank portion. The first female thread stabbing flank portion is located farther from the pipe axis and has a stabbing flank angle equal to the stabbing flank angle of the first male thread stabbing flank portion. The second female thread stabbing flank portion is located closer to the pipe axis and has a stabbing flank angle equal to the stabbing flank angle of the second male thread stabbing flank portion.

According to the above-described embodiment, the male thread stabbing flank includes a first male thread stabbing flank portion located farther from the pipe axis of the steel pipe and having a stabbing flank angle of −10 to 15 degrees and a portion located closer to the pipe axis and having a stabbing flank angle of 20 to 60 degrees, while the female thread stabbing flank includes a first female thread stabbing flank portion located farther from the pipe axis and having a stabbing flank angle equal to the stabbing flank angle of the first male thread stabbing flank portion and a second female thread stabbing flank portion located closer to the pipe axis and having a stabbing flank angle equal to the stabbing flank angle of the second male thread stabbing flank portion. This will prevent cross-threading and provide good compression load resistance.

The first pin further includes a first pin shoulder surface. The first pin shoulder surface is located on the tip of the first pin. The second pin further includes a second pin shoulder surface. The second pin shoulder surface is located on the tip of the second pin and is in contact with the first pin shoulder surface when the connection has been made up.

This will improve compression load resistance and enable controlling the amount of interference between the threads.

Embodiment 1

Embodiments of the threaded connection for steel pipe will now be described with reference to the drawings. The same and corresponding components in the drawings are labeled with the same characters, and their description will not be repeated.

Referring to FIG. 1, a threaded connection for steel pipe 10 according to Embodiment 1 is a threaded connection for connecting two steel pipes 20 to each other. The threaded connection 10 includes a tubular pin 30 and a tubular box 40. The pin 30 is located on one end 22 of the steel pipe 20. The pin 30 is inserted into the box 40 such that the box 40 and the pin 30 are made up.

The threaded connection for steel pipe 10 according to Embodiment 1 is a coupling-type connection including two pins 20 and a coupling 50. One pin 30 is located on an end 22 of one steel pipe 20. The other pin 30 is located on an end 22 of the other steel pipe 20. The coupling 50 includes two boxes 40 and an annular protrusion 52. The one box 40 is located on one end of the coupling 50. The other box 40 is located on the other end of the coupling 50. The protrusion 52 is located in the middle of the coupling 50. The one pin 30 is inserted into the one box 40 such that the one box 40 and the one pin 30 are made up. The other box 40 is located opposite to the one box 40, and the other pin 30 is inserted into the other box 40 such that the other box 40 and the other pin 30 are made up.

The pin 30 includes a male thread 31. The male thread is located on the outer periphery of the pin 30. The box 40 includes a female thread 41. The female thread 41 corresponds to the male thread 31 and is located on the inner periphery of the box 40. The male and female threads 31 and 41 are trapezoidal threads and tapered threads. That is, the male thread 31 is a helical thread on the outer periphery of the pin 30, and the helical diameter decreases as it goes toward the tip of the pin 30. The female thread 41 is a helical thread on the inner periphery of the box 40, and the helical diameter increases as it goes toward the opening end of the box 40. Preferably, the taper ratio of the tapered threads is 6.0 to 18.0%. The taper ratio is set so as to provide an appropriate thread-portion length relative to the wall thickness of the steel pipe. The taper ratio may be constant; preferably, however, the taper ratio of the male thread 31 decreases as it goes away from the tip of the pin 30, as described in detail further below.

When the connection has been made up, at least portions of the male and female threads 31 and 41 serve as a thread seal. The portions of the male and female threads serving as a thread seal have a length as measured in the pipe-axis direction three times the wall thickness of the steel pipe 20 or more. The portions of the male and female threads serving as a thread seal are perfect threads. The longer the length of the thread seal, the better the sealing performance. However, if the thread seal has an excessive length, machining requires costs and work and galling may occur during make-up. Preferably, the length of the thread seal is five times the wall thickness or less. FIG. 1 shows an implementation where the threaded connection 10 has no metal seal.

Figure 2:
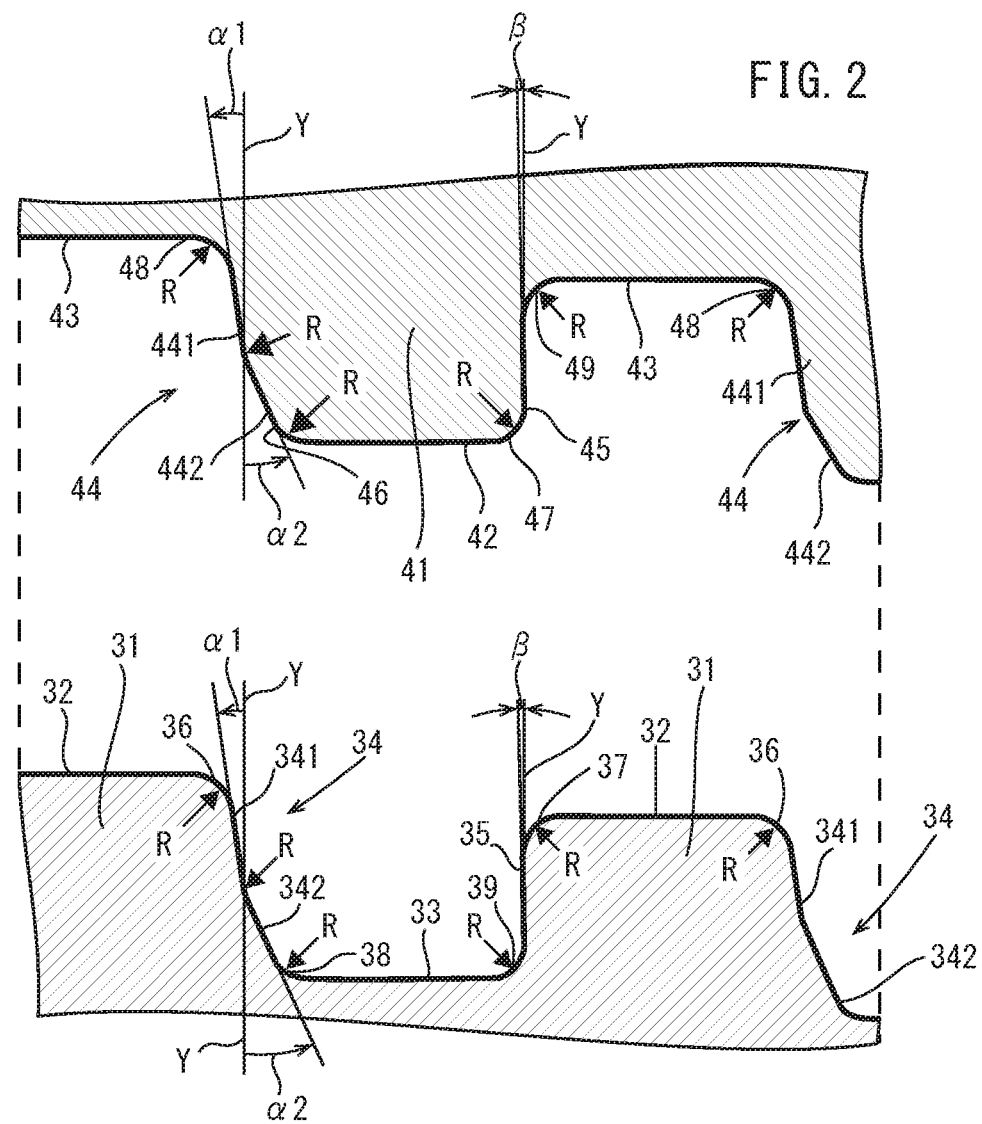
FIG. 2 is an enlarged longitudinal cross-sectional view of a male thread and a female thread shown in FIG. 1 for illustrating their shapes.
Figure 3:
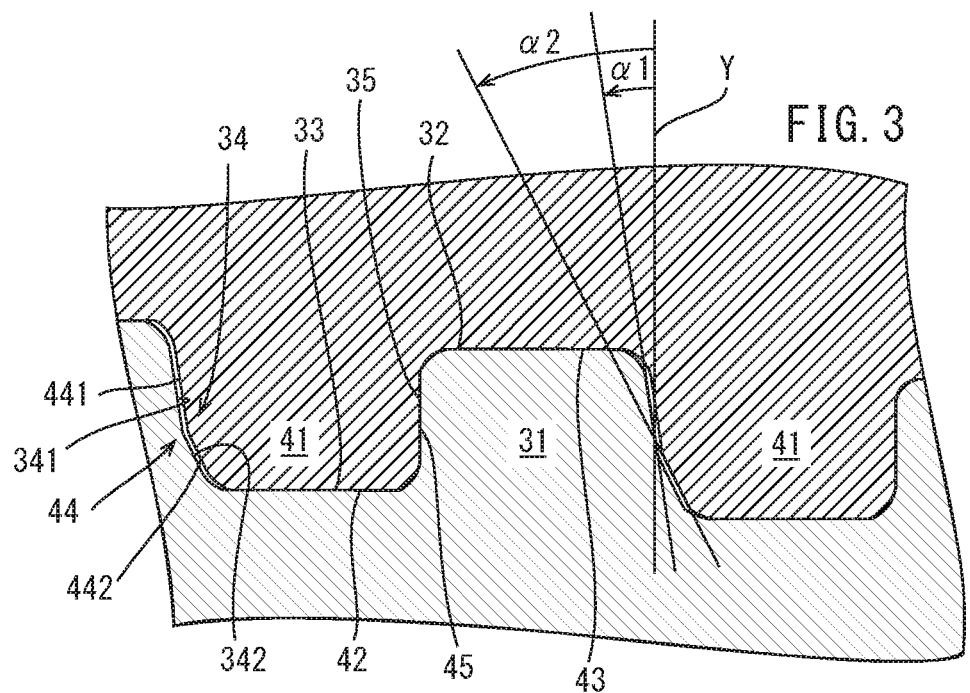
FIG. 3 is an enlarged longitudinal cross-sectional view of a male thread and a female thread shown in FIG. 1.

Referring to FIGS. 2 and 3, the male thread 31 includes a male thread crest 32, a male thread root 33, a male thread stabbing flank 34, and a male thread load flank 35. The male thread stabbing flank 34 is located closer to the tip of the pin 30. The male thread load flank 35 is located farther from the tip of the pin 30.

The male thread stabbing flank 34 includes two male thread stabbing flank portions 341 and 342. The male thread stabbing flank portion 341 is farther from the pipe axis X of the steel pipe 20 and has a stabbing flank angle $\alpha1$. The male thread stabbing flank portion 342 is closer to the pipe axis X and has a stabbing flank angle $\alpha2$. The stabbing flank angles $\alpha1$ and $\alpha2$ are angles of inclination of the male thread stabbing flank 34 (male thread stabbing flank portions 341 and 342) relative to a plane Y perpendicular to the pipe axis X. If the stabbing flank 34 overhangs, the stabbing flank angle $\alpha1$ is negative. The stabbing flank angle $\alpha2$ is larger than the stabbing flank angle $\alpha1$ ($\alpha2>\alpha1$). The stabbing flank angle $\alpha1$ is −15 to 15 degrees, and preferably 8 to 12 degrees, for example about 10 degrees. The stabbing flank angle $\alpha2$ is 20 to 60 degrees, and preferably 28 to 32 degrees, for example about 30 degrees. As such, the male thread stabbing flank 34 is concave at about its middle.

The height of the male thread stabbing flank portion 342 (i.e. length between the male thread root 33 and the border between the male thread stabbing flank portions 341 and 342) is 25 to 60%, for example 35%, of the height of the male thread.

The female thread 41 includes a female thread crest 42, a female thread root 43, a female thread stabbing flank 44, and a female thread load flank 45. The female thread crest 42 faces the male thread root 33. The female thread root 43 faces the male thread crest 32. The female thread stabbing flank 44 faces the male thread stabbing flank 34. The female thread load flank 45 faces the male thread load flank 35.

The female thread stabbing flank 44 includes two female thread stabbing flank portions 441 and 442. The female thread stabbing flank portion 441 is farther from the pipe axis X and has a stabbing flank angle α1 equal to the stabbing flank angle α1 of the male thread stabbing flank portion 341. The female thread stabbing flank portion 442 is located closer to the pipe axis X and has a stabbing flank angle α2 equal to the stabbing flank angle α2 of the male thread stabbing flank portion 342. As such, the female thread stabbing flank 44 is convex at about its middle. The stabbing flank angles α1 and α2 of the male thread stabbing flank portions 341 and 342 need not be exactly equal to the stabbing flank angles α1 and α2 of the female thread stabbing flank portions 441 and 442, and they are only required to be substantially equal. That is, the stabbing flank angles α1 and α2 may have errors of margin due to machining.

Preferably, the female thread stabbing flank portion 442 has a height equal to the height of the male thread stabbing flank portion 342. This prevents the clearance between the thread surfaces of the pin and box from becoming larger than necessary such that the thread seal construction will provide good sealing performance. The height of the male thread stabbing flank portion 342 need not be exactly equal to the height of the female thread stabbing flank portion 442, and they are only required to be substantially equal. That is, these heights may have errors of margin due to machining.

The male thread 31 further includes male thread round surfaces 36 to 39. The male thread round surface 36 is located on the corner between the male thread crest 32 and male thread stabbing flank 34. The male thread round surface 37 is located on the corner between the male thread crest 32 and male thread load flank 35. The male thread round surface 38 is located on the corner between the male thread root 33 and male thread stabbing flank 34. The male thread round surface 39 is located on the corner between the male thread root 33 and male thread load flank 35.

The female thread 41 includes a female thread round surfaces 46 to 49. The female thread round surface 46 is located on the corner between the female thread crest 42 and female thread stabbing flank 44. The female thread round surface 47 is located on the corner between the female thread crest 42 and female thread load surface 45. The female thread round surface 48 is located on the corner between the female thread root 43 and female thread stabbing flank 44. The female thread round surface 49 is located on the corner between the female thread root 43 and female thread load flank 45.

The round surfaces 36 to 39 and 46 to 49 are so-called R surfaces (i.e. round chamfered surfaces) and have a predetermined radius of curvature. The radius of curvature is 0.1 to 1.2 mm, and preferably 0.3 to 0.8 mm.

The male thread load flank 35 has a load flank angle ß. The load flank angle ß is an angle of inclination of the male thread load flank 35 relative to a plane Y perpendicular to the pipe axis X. If the load flank 35 overhangs, the load flank angle ß is negative. The load flank angle ß is −10 to 3 degrees, and preferably −5 to −1, and for example about −3 degrees. The female thread load flank 45 has a load flank angle ß equal to the load flank angle ß of the male thread load flank 35. The load flank angle ß of the male thread load flank 35 need not be exactly equal to the load flank angle ß of the female thread load flank 45, and they are only required to be substantially equal. That is, the load flank angle ß may have an error of margin due to machining.

The male thread crest 32, male thread root 33, female thread crest 42 and female thread root 43 are parallel to the pipe axis X. More specifically, the lines of the planes 32, 33, 42 and 43 appearing in a longitudinal cross section containing the pipe axis X are parallel to the pipe axis X.

As shown in FIG. 3, the male thread stabbing flank 34 and female thread stabbing flank 44 have a clearance therebetween of 60 to 120 μm when the connection has been made up. The male thread crest 32 and female thread root 43 have a clearance therebetween of 0 to 50 μm when the connection has been made up. The male thread root 33 and female thread crest 42 also have a clearance therebetween of 0 to 50 μm when the connection has been made up.

Returning to FIG. 1, the pin 30 further includes a pin shoulder surface 24 provided on the tip of the pin 30. The box 40 further includes a box shoulder surface 54 that is to be in contact with the pin shoulder surface 24 when the connection has been made up.

Figure 4:
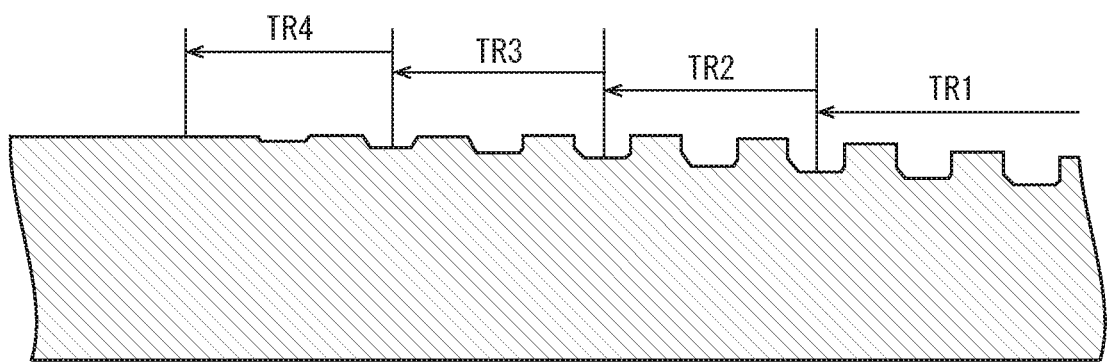
FIG. 4 is an enlarged longitudinal cross-sectional view of a pin shown in FIG. 1.

Referring to FIG. 4, the male thread 31 includes a tapered thread having a taper ratio decreasing as it goes away from the tip of the pin 30, as represented by TR1 to TR4. For example, TR1=12.5%, TR2=12.0%, TR3=11.5% and TR4=11.0%.

Embodiment 2

Figure 5:
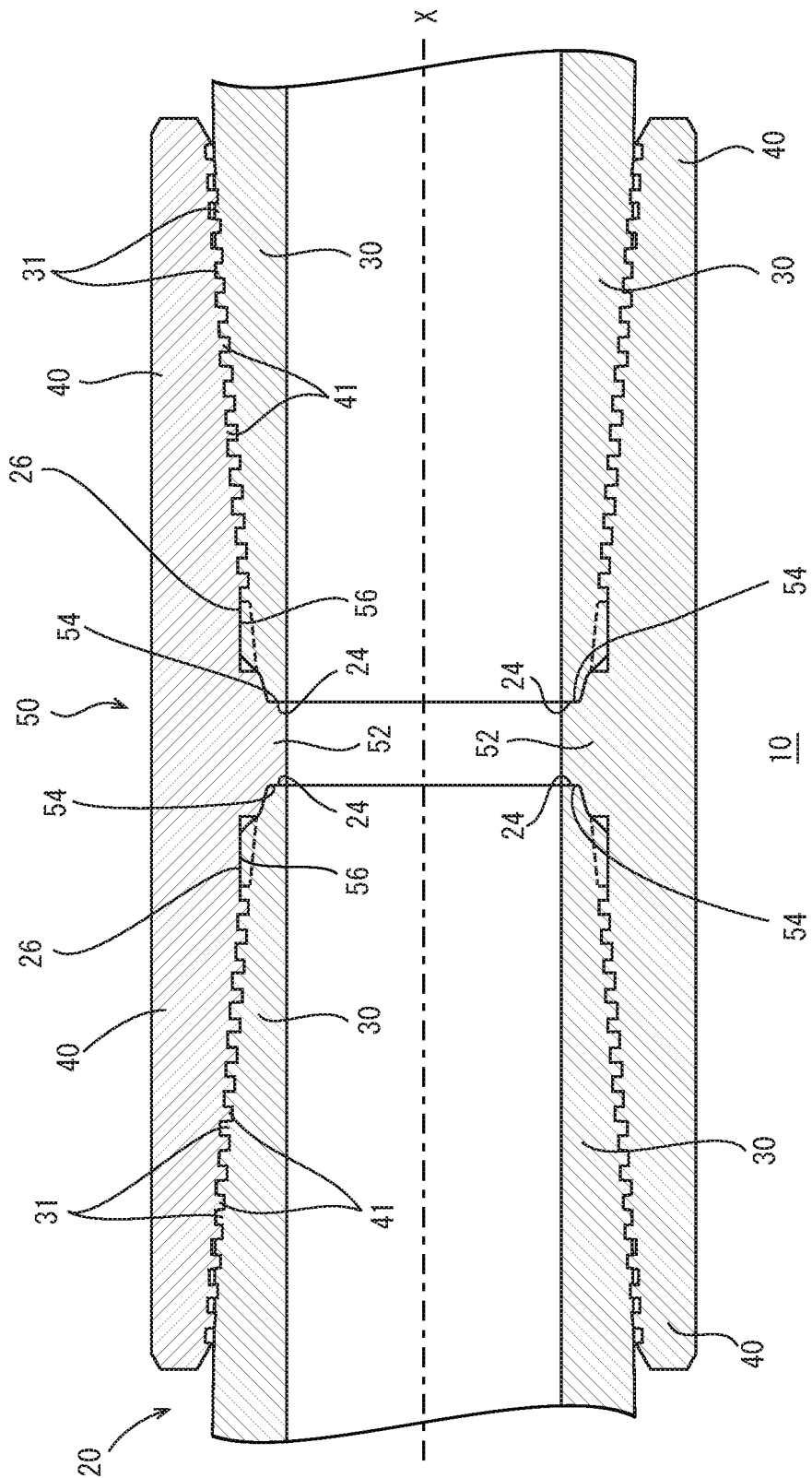
FIG. 5 is a longitudinal cross-sectional view of a threaded connection for steel pipe according to Embodiment 2, taken along the pipe-axis direction thereof.

As shown in FIG. 5, the threaded connection 10 may include a metal seal. More specifically, the pin 30 further includes a pin sealing surface 26 provided between the tip of the pin 30 and the male thread 31 and on the outer periphery of the pin 30. The box 50 further includes a box sealing surface 56 provided to face the pin sealing surface 26 and on the inner periphery of the box 50 to adhere to the pin sealing surface 26 when the connection has been made up. The pin sealing surface 26 and box sealing surfaces 56 form a metal seal.

Embodiment 3

Figure 6:
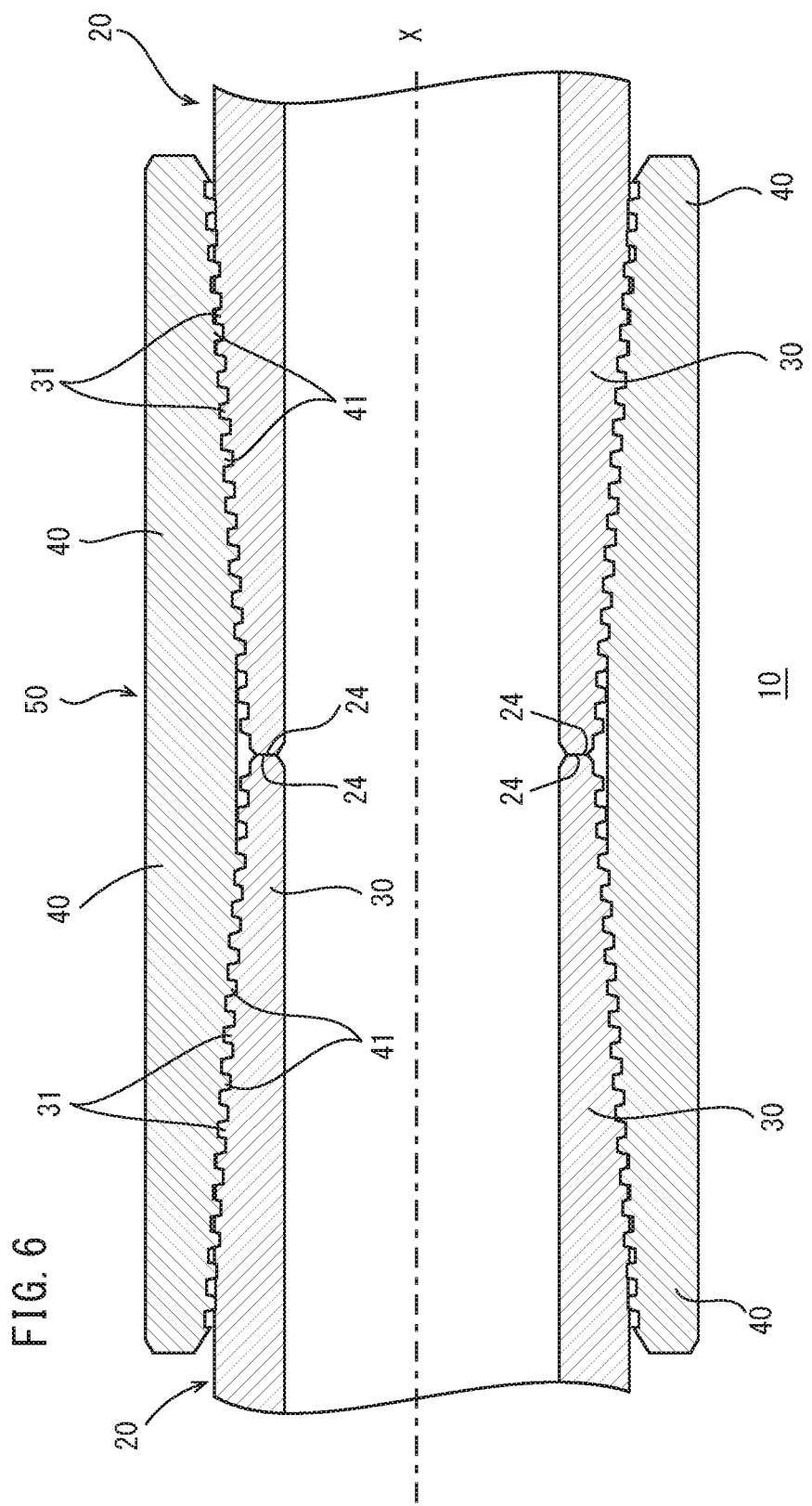
FIG. 6 is a longitudinal cross-sectional view of a threaded connection for steel pipe according to Embodiment 3, taken along the pipe-axis direction thereof.

As shown in FIG. 6, the box 50 may not include the protrusion 52. In such implementations, the pin shoulder surface 24 of the one pin 30 and the pin shoulder surface 24 of the other pin are in contact with each other when the connection has been made up. Embodiment 3 has a so-called pin-to-pin construction.

[Prior Art]

Figure 7:
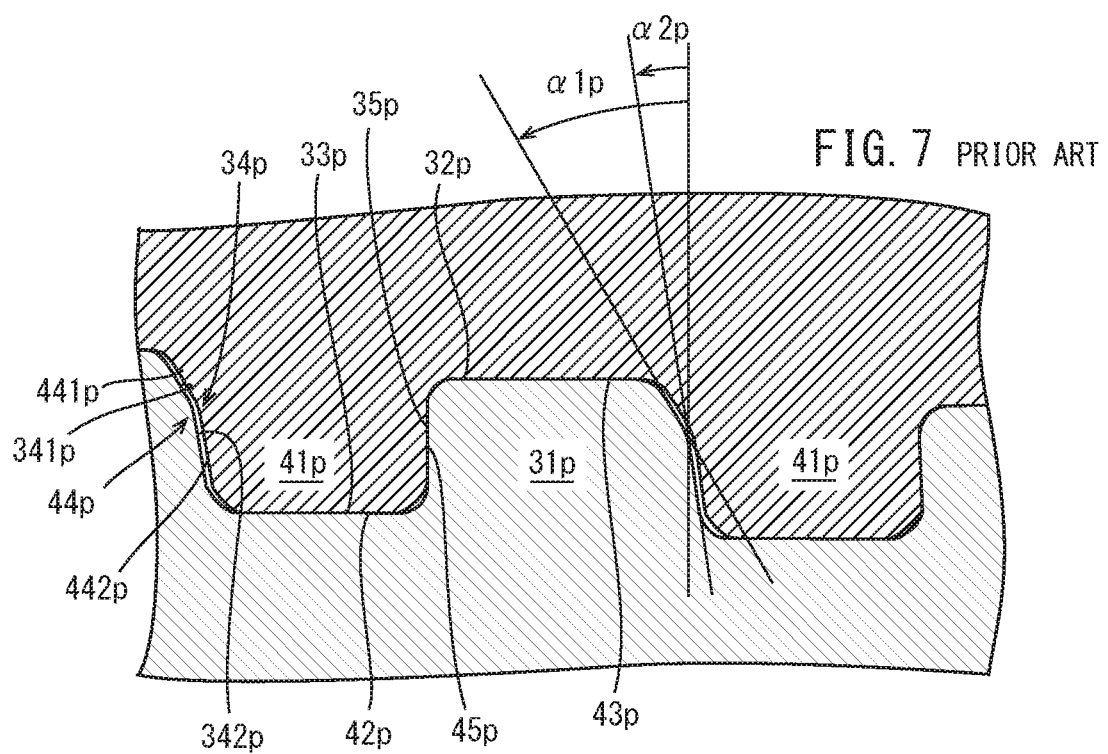
FIG. 7 is an enlarged longitudinal cross-sectional view of a male thread and a female thread of a threaded connection according to prior art.

Referring to FIG. 7, in the threaded connection disclosed by JP Hei8(1996)-303657 A, the male thread 31p of the pin includes a male thread crest 32p, a male thread root 33p, a male thread stabbing flank 34p, and a male thread load flank 35p. The male thread stabbing flank 34p includes two male thread stabbing flank portions 341p and 342p. The stabbing flank angle α2p of the stabbing flank portion 342p is smaller than the stabbing flank angle α1p of the stabbing flank portion 341p (α2p<α1p). Thus, the male thread stabbing flank 34p is convex at about its middle.

On the other hand, the female thread 41p of the box includes a female thread crest 42p, a female thread root 43p, a female thread stabbing flank 44p and a female thread load flank 45p. The female thread stabbing flank 44p includes two female thread stabbing flank portions 441p and 442p. The stabbing flank angle α1p of the female thread stabbing flank portion 441p is equal to the stabbing flank angle α1p of the male thread stabbing flank portion 341p. The stabbing flank angle α2p of the female thread stabbing flank portion 442p is equal to the stabbing flank angle α2p of the male thread stabbing flank portion 342p. As such, the female thread stabbing flank 44p is concave at about its middle.

[Cross-Threading]

Figure 8:
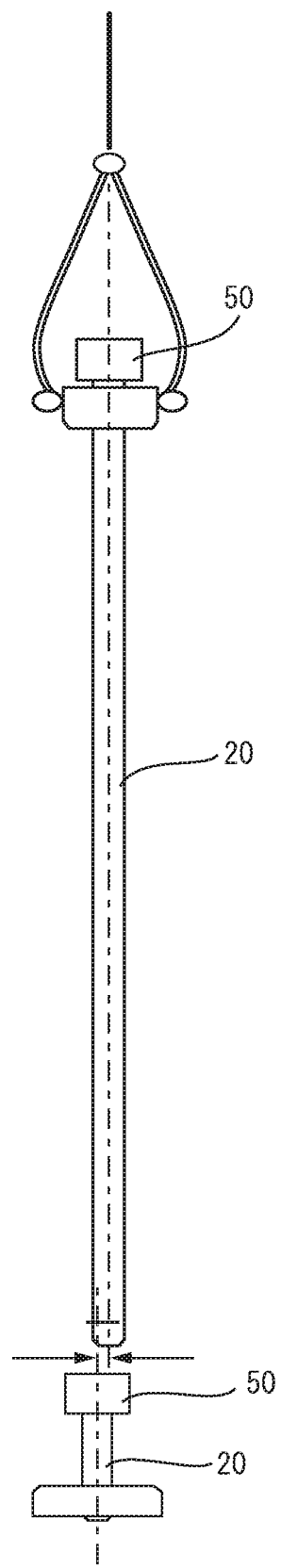
FIG. 8 illustrates how steel pipes are connected on the rig.

As shown in FIG. 8, to connect steel pipes 20 on the rig, a steel pipe 20 together with a coupling 50 is hung and stabbing of the threads occurs. When the threads fit together and during the process of rotation to tighten the threads, the position at which the threads can fit together without rotation of the threads will be referred to as "stabbing position". At the ideal stabbing position, at which the steel pipe 20 is aligned with the pipe axis of the coupling 50, the entire male thread crest is in contact with the entire female thread crest. However, during operations on the sea or on land, the steel pipe 20, which is being hung, swings due to effects of waves and winds, and thus a swing angle of about 1 degree is usually present.

Figure 9:
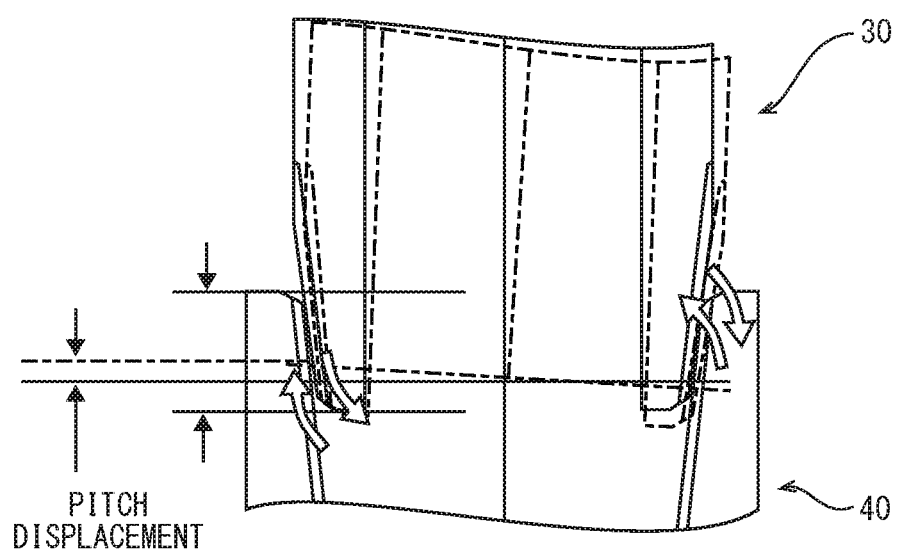
FIG. 9 is a longitudinal cross-sectional view of steel pipes for illustrating cross-threading occurring while they are connected.

As indicated by one-dot-chain lines of FIG. 9, when the pin 30 is inserted obliquely into the box 40, fitting occurs with a thread pitch displacement between the male and female thread crests at the stabbing position, an inappropriate situation where, when the pin 30 is rotated, the threads immediately dig into each other and become locked. This phenomenon is called "cross-threading". The angle at which inappropriate drilling due to a pitch displacement occurs is called pitch displacement angle. Cross-threading tends to occur when the swing angle exceeds the pitch displacement angle. When cross-threading occurs, the pin 30 must be rotated backward to remove it from the box 40, prolonging the time taken to connect the steel pipes 20.

Figure 10:
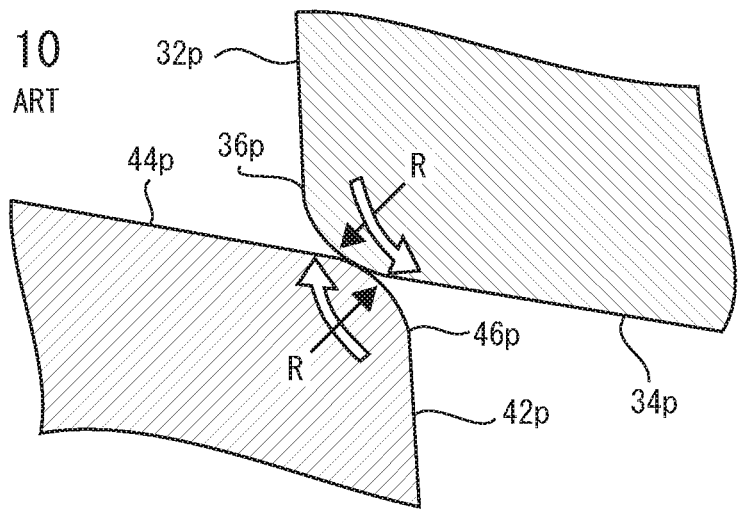
FIG. 10 is an enlarged longitudinal cross-sectional view of a male thread and a female thread with small stabbing flank angles, where cross-threading is occurring.

When cross-threading occurs, as shown in FIG. 10, the male thread round surface 36p located between the stabbing flank 34p and male thread crest 32p of the pin and the female thread round surface 46p located between the stabbing flank 44p and female thread crest 42p of the box are locked. Cross-threading tends to occur if the stabbing flank angles of the male and female threads are small.

Figure 11:
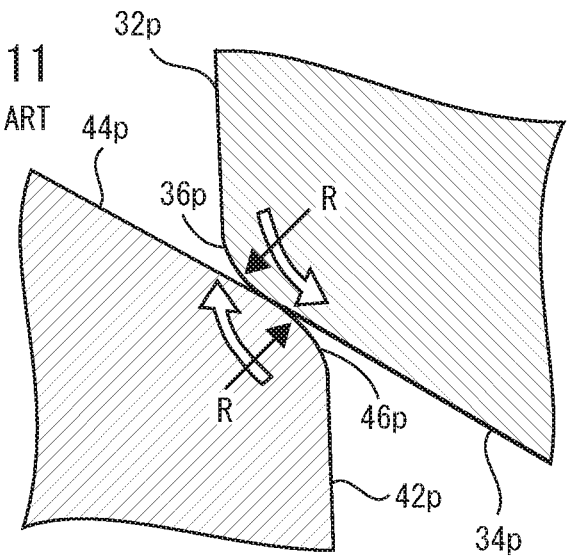
FIG. 11 is an enlarged longitudinal cross-sectional view of a male thread and a female thread with large stabbing flank angles, where cross-threading is occurring.

On the other hand, as shown in FIG. 11, if the stabbing flank angles of the male and female threads are large, locking can be resolved and cross-threading is less likely to occur. However, if the stabbing flank angles are large, compression loads in the pipe-axis direction may disengage the threads and the male thread crest may jump over the female thread crest, a phenomenon called jump-in. If the amount of interference in radial directions of the threads is increased to improve the sealing performance under high external or internal pressure, the pressure on the stabbing flank becomes high, potentially leading to galling.

As shown in Table 1, the lower limit of the pitch displacement angle at which cross-threading occurs depends on thread pitch and the outer diameter of the steel pipe. If the thread pitch is larger than 3 threads/inch, thread design is difficult. In a steel pipe with an outer diameter above 16 inches, the pitch displacement angle at which cross-threading occurs with 3 threads/inch is close to one degree. That is, a construction that prevents cross-threading, particularly in a large-diameter steel pipe with an outer diameter above 16 inches, is desired. Of course, a construction that prevents cross-threading in a steel pipe with an outer diameter of 16 inches or less is also suitable.

TABLE 1

| Thread | | Outer diameter (inch) | | | | | |
|---|---|---|---|---|---|---|---|
| | pitch | 20 | 18⅝ | 16 | 13⅜ | 9⅝ | 7 |
| Pitch drift angle at which cross-threading occurs (deg.) | 3 threads/inch | 0.96 | 1.03 | 1.19 | 1.43 | 1.98 | 2.73 |
| | 5 threads/inch | 0.57 | 0.62 | 0.72 | 0.86 | 1.19 | 1.64 |

An object of the present embodiment is to prevent cross-threading by having two-portion stabbing flanks without decreasing compression load resistance and galling resistance, i.e. to maintain them.

Figure 12:
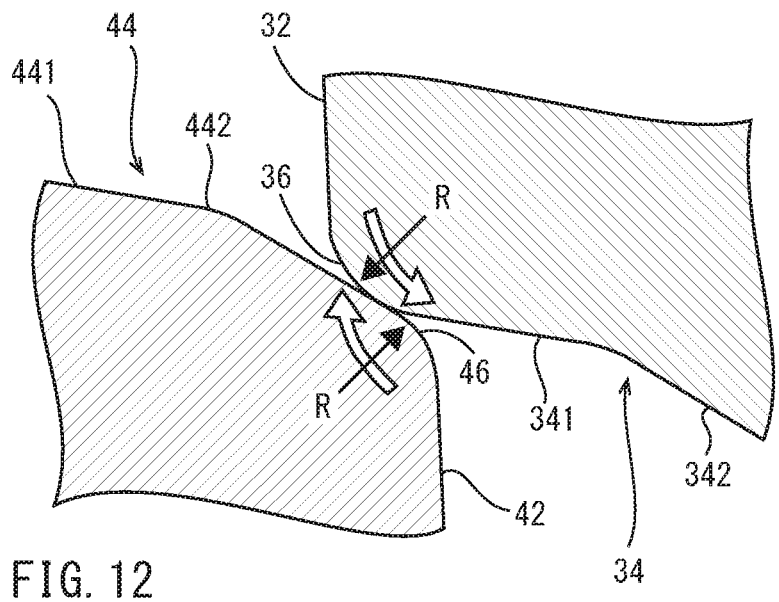
FIG. 12 is an enlarged longitudinal cross-sectional view of the male and female threads shown in FIGS. 2 and 3, where cross-threading is occurring.
Figure 13:
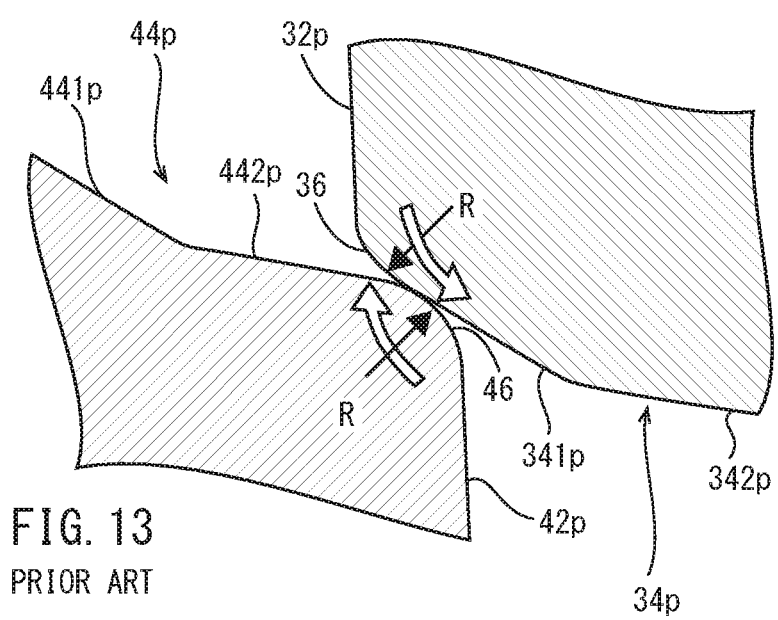
FIG. 13 is an enlarged longitudinal cross-sectional view of the male and female threads shown in FIG. 7, where cross-threading is occurring.

As shown in FIGS. 12 and 13, as each stabbing flank has two portions and the clearance between the threads is small, the sealing performance provided by the thread surfaces can be maintained. In addition, to prevent cross-threading while maintaining compression load resistance and galling resistance, the stabbing flank angle of one of the two stabbing flank portions may be increased. Increasing the stabbing flank angle facilitates resolving a lock and prevents cross-threading.

Compared with the prior art implementation shown in FIG. 13, the embodiment shown in FIG. 12 has a small stabbing flank angle of the stabbing flank portion 441 closer to the box body, which has high stiffness, such that the stabbing flank portion 441 is susceptible to compression loads. Thus, the engagement of the threads can be maintained until the limit compression load is reached. Further, even when an internal pressure is applied at the same time as a compression load, a sealing performance can be maintained without a gap along a radial direction of the thread being present. Further, the female thread restricts the male thread until the limit is reached at which jump-in occurs due to a limit compression load, thereby preventing the threads from being disengaged.

Figure 14:
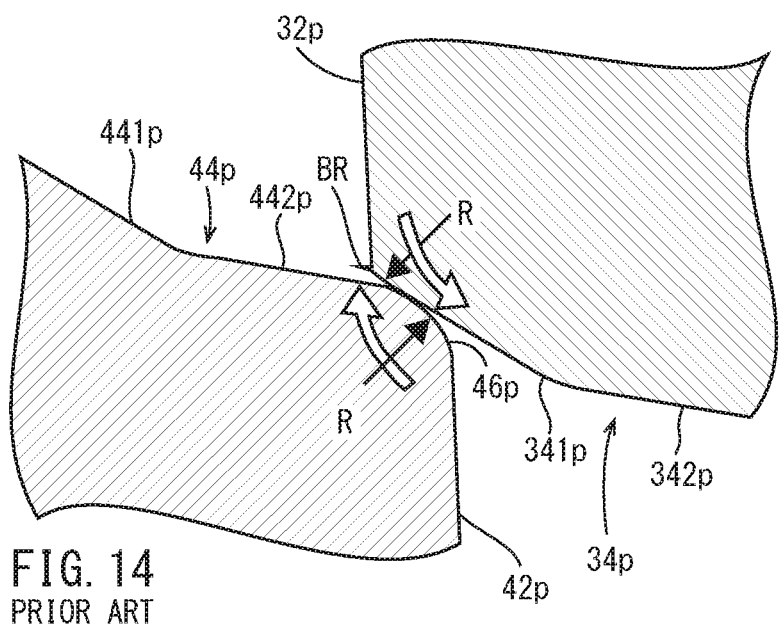
FIG. 14 is an enlarged longitudinal cross-sectional view of the male and female threads shown in FIG. 7, where there is a cutting burr and cross-threading is occurring.
Figure 15:
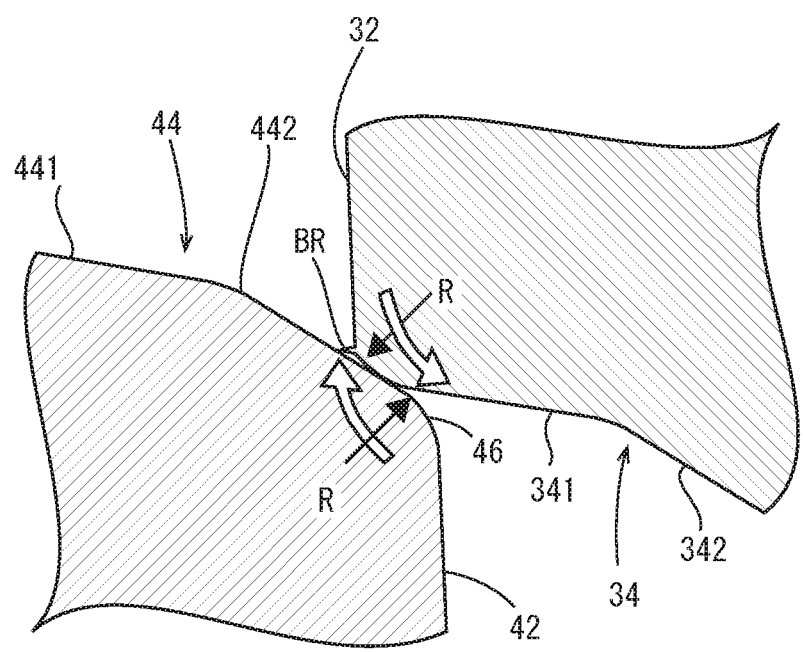
FIG. 15 is an enlarged longitudinal cross-sectional view of the male and female threads shown in FIGS. 2 and 3, where there is a cutting burr and cross-threading is occurring.

As determined along the pipe-axis direction, the male thread of the pin provides perfect threads toward the front end and imperfect threads toward the rear end. As shown in FIGS. 14 and 15, during machining, a burr BR is created by the tool at an edge of an imperfect thread crest 32p or 32. This burr BR may lock a thread surface of the box, causing cross-threading. Suitably, to resolve a lock with a burr BR on an imperfect thread, the surface facing the burr BR when the locks are resolved one after another to remove the relative inclination of the male thread relative to the female thread is flat and the stabbing flank angle is large.

As shown in FIG. 14, the burr BR on an imperfect thread does not slide in contact with the female thread round surface 46p located between the female thread crest 42p and stabbing flank 44p of the box. As such, in the implementation shown in FIG. 14, a lock cannot easily be resolved and cross-threading tends to occur.

On the other hand, as shown in FIG. 15, the burr BR on an imperfect thread slides in contact with a stabbing flank portion 442 with a large stabbing flank angle. Thus, in the implementation shown in FIG. 15, a lock can easily be resolved and cross-threading is less likely to occur.

Thus, according to the present embodiment, a lock can be easily resolved and cross-threading is less likely to occur. Moreover, compression load resistance and galling resistance will not decrease, i.e. be maintained.

Although embodiments have been described, the present invention is not limited to the above-described embodiments, and various modifications are possible without departing from the spirit of the invention.

EXAMPLES

To verify the effects of the above-described embodiments, real-pipe tests and numerical simulation analysis by the elastic-plastic finite element method (FEM) were performed. The conditions and results of the tests are shown in Table 1.

up, and then a compression load substantially equal to the nominal yield strength of the steel pipe (100%) was applied thereto, and the sealing performance was evaluated based on whether the liquid leaked.

For each of the Examples, the stabbing performance test was conducted five times and cross-threading did not occur in any of the five rounds. Further, for each of the Examples, the make/break performance test was conducted three times and galling did not occur in any of the three rounds. In

TABLE 2

|  |  | Inv. Ex. | Comp. Ex. 1 | Comp. Ex. 2 | Comp. Ex. 3 |
|---|---|---|---|---|---|
| Threaded connection | thread type | buttress-type trapezoidal thread | | | |
|  | stabbing angle | 10 deg./30 deg. | 10 deg. | 30 deg. | 30 deg/10 deg. |
|  | load angle | −3 deg. | 3 deg. | 0 deg | −3 deg. |
|  | thread ridge/thread root | parallel | tapered | tapered | parallel |
|  | thread taper | 1/8 | 1/12 | 1/7.5 | 1/8 |
|  | thread lead | 3TPI | | | |
|  | thread height | 2.4 mm | | | |
|  | stabbing clearance | about 90 μm | about 125 μm | about 100 μm | about 90 μm |
|  | thread diameter interference | 1.2 mm | 1.2 mm | 1.2 mm | 1.2 mm |
|  | type | coupling-type (outer diameter of 498.5 mm) | | | |
|  | shoulder | inner surface shoulder | no shoulder | inner surface shoulder | inner surface shoulder |
|  | perfect thread length | 80 mm | 70 mm | 77 mm | 80 mm |
| Stabbing performance | | Good | Bad | Good | Bad |
|  | | (0/5) | (4/5) | (0/3) | (—) |
| Make/break performance | | Good | Good | Bad | Good |
|  | | (0/3) | (—) | (1/3) | (—) |
| Sealing performance | | Good | Bad | Bad | Bad |
| Compression load resistance | threadclearance | Good | Bad | Bad | Bad |
|  | buckling | Good | — | — | Bad |

[Real Pipe Tests]
Real pipes, as specified below, were used:
Size: 18⅝, 136# (with a nominal outer diameter of 473.08 mm and a wall thickness of 14.71 mm)
Material: P110 steel according to the American Petroleum Institute (API) standards (with a nominal yield strength of 862 N/mm$^2$, an elastic modulus of 205 kN/mm$^2$ and a Poisson's ratio of 0.3)

Each of the threaded connections according to the Examples included two-portion stabbing flanks as described above. The stabbing flank angle α1 was 10 degrees and the stabbing flank angle α2 was 30 degrees. Both Comparative Examples 1 and 2 had usual one-portion stabbing flanks. The stabbing flank angle of Comparative Example 1 was 10 degree and the stabbing flank angle of Comparative Example 2 was 30 degrees.

Steel pipes as described above were connected using the threaded connections according to the Examples and Comparative Examples 1 and 2, and the stabbing performance, make/break performance and sealing performance of these threaded connections were evaluated by tests. More specifically, in a stabbing performance test, a situation was simulated where, during the running of oil country tubular goods, steel pipes hung on the rig were swinging, and a test was conducted where the steel pipes were connected using the threaded connection up until a stage preceding the occurrence of interference in radial directions of the threads and then released (stabbing make/stabbing break test), and the stabbing performance was evaluated based on whether cross-threading occurred. In a make/break performance test, a steel pipe was tightened until the amount of interference in radial directions of the threaded connection reached a predetermined level and then loosened (make/break test), and the make/break performance was evaluated based on whether galling occurred. In a sealing performance test, a threaded connection was filled with a liquid and was made contrast, for Comparative Example 1, the stabbing performance test was conducted five times and cross-threading occurred in four of the five rounds. Although the make/break performance test was not conducted for Comparative Example 1, it is assumed that galling would not have occurred if stabbing had been successful without cross-threading. For Comparative Example 2, the stabbing performance test was conducted three times, and cross-threading did not occur in any of the three rounds. For Comparative Example 2, the make/break performance test was conducted three times and galling occurred in the third round.

After the sealing performance test, no liquid leak occurred in the Examples. In contrast, liquid leak occurred in both Comparative Examples 1 and 2.

[FEM Analysis]
Similarly to the Examples, the male and female threads of the threaded connection according to Example 3 included two-portion stabbing flanks. The threaded connection according to Comparative Example 3 was the threaded connection according to prior art discussed above. The stabbing flank angle α1 of Comparative Example 3 was 30 degrees and the stabbing flank angle α2 was 10 degrees.

Figure 16:
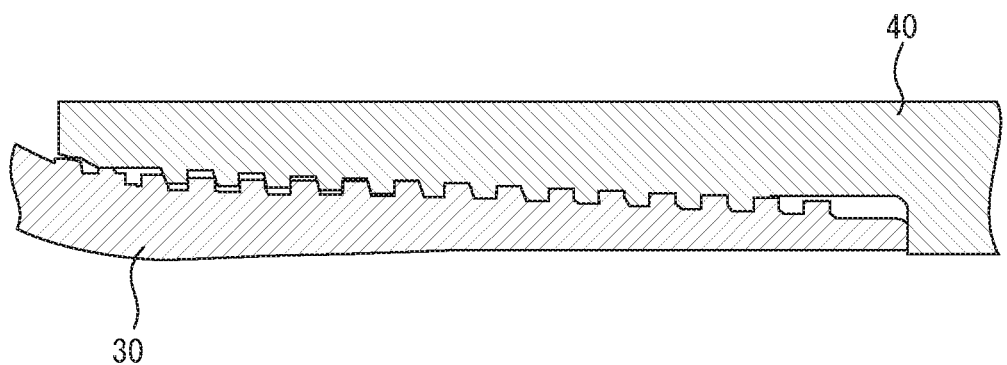
FIG. 16 is a longitudinal cross-sectional view of a threaded connection having the male and female threads shown in FIGS. 2 and 3, illustrating a result of a compression load test.
Figure 17:
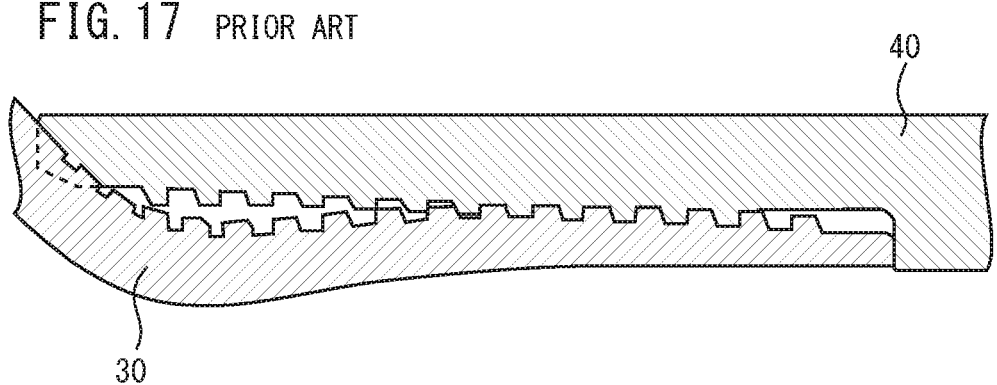
FIG. 17 is a longitudinal cross-sectional view of a threaded connection having the male and female threads shown in FIG. 7, illustrating a result of a compression load test.

Examples of calculation results from simulations of simple compression loads on the threaded connections according to the Examples and Comparative Example 3 are shown in FIGS. 16 and 17. Each of these drawings shows that the pin 30 in each of the Examples and Comparative Example 3 was subjected to excessive compression loads and buckled. However, the amount of deformation due to buckling was smaller in the Examples shown in FIG. 16 than in Comparative Example 3 shown in FIG. 17. This reveals that the Examples are less likely to buckle than Comparative Example 3, that is, have better compression load resistance.

Figure 18:
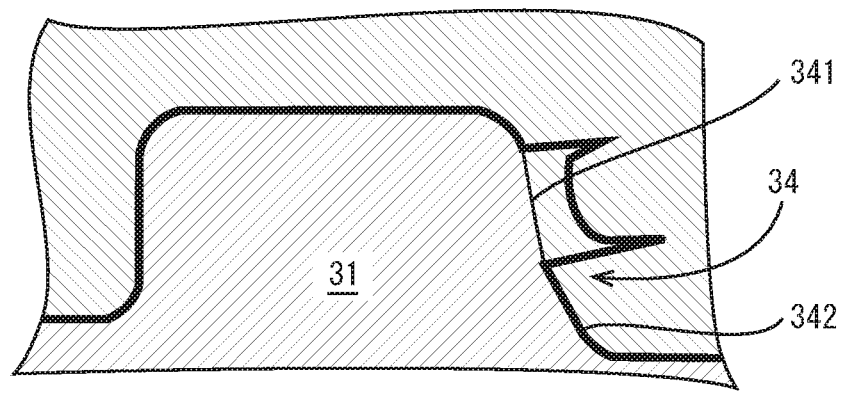
FIG. 18 illustrates an example of a calculation result of contact stress on the stabbing flanks shown in FIGS. 2 and 3, where compression loads are applied to the male thread.
Figure 19:
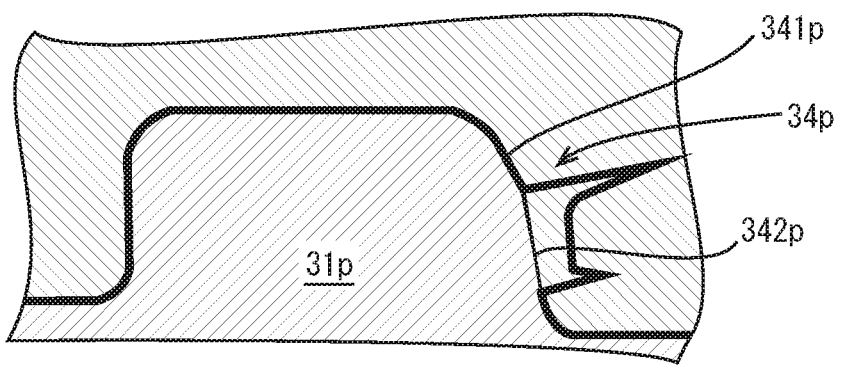
FIG. 19 illustrates an example distribution of a calculation result of contact stress on the stabbing flanks shown in FIG. 7, where compression loads are applied to the male thread.

The reasons therefor will be given using examples of calculation results of contact stresses on the stabbing flanks during application of compression loads, as shown in FIGS. 18 and 19. FIG. 18 shows an example of a contact stress distribution for one of the Examples. FIG. 17 shows an example of a contact stress distribution for Comparative Example 3. In each of FIGS. 18 and 19, contact stresses on the stabbing flank during application of compression loads were higher at that one of the two stabbing flank portions which had a smaller stabbing flank angle. That is, it is estimated that, in the Example of FIG. 18, a surface closer to the box body, which has a larger stiffness, supports the high contact stresses, thereby providing a better compression load resistance.

What is claimed is:

1. A threaded connection comprising:
a tubular pin located on one end of a steel pipe; and
a tubular box, the pin being inserted into the box such that the box and pin are made up,
wherein the pin includes a male thread provided on an outer periphery of the pin,
the box includes a female thread corresponding to the male thread and provided on an inner periphery of the box,
the male thread and the female thread are trapezoidal threads and tapered threads,
when the connection has been made up, at least a portion of the male thread and at least a portion of the female thread serve as a thread seal,
the male thread includes:
a male thread crest;
a male thread root;
a male thread stabbing flank located closer to a tip of the pin; and
a male thread load flank located farther from the tip of the pin,
the male thread stabbing flank includes:
a first male thread stabbing flank portion located farther from a pipe axis of the steel pipe and having a stabbing flank angle of −10 to 15 degrees; and
a second male thread stabbing flank portion located closer to the pipe axis and having a stabbing flank angle of 20 to 60 degrees,
the second male thread stabbing flank portion has a height of 20 to 60% of that of the male thread,
the female thread includes:
a female thread crest facing the male thread root;
a female thread root facing the male thread crest;
a female thread stabbing flank facing the male thread stabbing flank; and
a female thread load flank facing the male thread load flank,
the female thread stabbing flank includes:
a first female thread stabbing flank portion located farther from the pipe axis and having a stabbing flank angle equal to the stabbing flank angle of the first male thread stabbing flank portion; and
a second female thread stabbing flank portion located closer to the pipe axis and having a stabbing flank angle equal to the stabbing flank angle of the second male thread stabbing flank portion.

2. The threaded connection according to claim 1, wherein the male thread further includes a first male thread round surface located on a corner between the male thread crest and the male thread stabbing flank, and
the female thread further includes a first female thread round surface located on a corner between the female thread crest and the female thread stabbing flank.

3. The threaded connection according to claim 2, wherein the male thread further includes:
a second male thread round surface located on a corner between the male thread crest and the male thread load flank;
a third male thread round surface located on a corner between the male thread root and the male thread stabbing flank; and
a forth male thread round surface located on a corner between the male thread root and the male thread load flank, and
the female thread further includes:
a second female thread round surface located on a corner between the female thread crest and the female thread load flank;
a third female thread round surface located on a corner between the female thread root and the female thread stabbing flank; and
a fourth female thread round surface located on a corner between the female thread root and the female thread load flank.

4. The threaded connection according to claim 1, wherein the male thread load flank has a load flank angle of −10 to 3 degrees, and
the female thread load flank has a load flank angle equal to the load flank angle of the male thread load flank.

5. The threaded connection according to claim 1, wherein the male thread crest, the male thread root, the female thread crest, and the female thread root are parallel to the pipe axis.

6. The threaded connection according to claim 1, wherein the male thread stabbing flank and the female thread stabbing flank have a clearance therebetween of 60 to 120 μm when the connection has been made up.

7. The threaded connection according to claim 1, wherein the male thread crest and the female thread root have a clearance therebetween of 0 to 50 μm when the connection has been made up, and the male thread root and the female thread crest have a clearance therebetween of 0 to 50 μm when the connection has been made up.

8. The threaded connection according to claim 1, wherein the pin further includes a pin shoulder surface located on the end of the pin, and the box further includes a box shoulder surface in contact with the pin shoulder surface when the connection has been made up.

9. The threaded connection according to claim 1, wherein the male thread includes a tapered thread having a taper ratio decreasing away from the tip of the pin.

10. The threaded connection according to claim 1, wherein the pin further includes a pin sealing surface located between the tip of the pin and the male thread and on the outer periphery of the pin, and
the box further includes a box sealing surface facing the pin sealing surface and located on the inner periphery of the box, the box sealing surface adhering to the pin sealing surface when the connection has been made up.

11. The threaded connection according to claim 1, wherein the portions of the male thread and the female thread serving as the thread seal have a length as measured in a pipe-axis direction three times a wall thickness of the steel pipe or more.

12. The threaded connection according to claim 1, wherein the steel pipe has an outer diameter above 16 inches.

13. The threaded connection according to claim 1, wherein the steel pipe has an outer diameter of 16 inches or below.

14. A threaded connection for connecting two steel pipes to each other, comprising:

a tubular first pin located on an end of one pipe of the steel pipes;

a tubular second pin located on an end of the other pipe of the steel pipes; and a coupling including a tubular first box, the first pin being inserted into the first box such that the first box and first pin are made up, and a tubular second box located opposite to the first box, the second pin being inserted into the second box such that the second box and second pin are made up, wherein each of the first and second pins includes a male thread provided on an outer periphery of the pin, each of the first and second boxes includes a female thread corresponding to the male thread and provided on an inner periphery of the box, the male thread and the female thread are trapezoidal threads and tapered threads, when the connection has been made up, at least a portion of the male thread and at least a portion of the female thread serve as a thread seal, the male thread includes:

a male thread crest;

a male thread root;

a male thread stabbing flank located closer to a tip of the pin; and a male thread load flank located farther from the tip of the pin, the male thread stabbing flank includes:

a first male thread stabbing flank portion located farther from a pipe axis of the steel pipe and has a stabbing flank angle of −10 to 15 degrees; and a second male thread stabbing flank portion is located closer to the pipe axis and has a stabbing flank angle of 20 to 60 degrees, the second male thread stabbing flank portion has a height of 20 to 60% of that of the male thread, the female thread includes:

a female thread crest facing the male thread root;

a female thread root facing the male thread crest;

a female thread stabbing flank facing the male thread stabbing flank; and a female thread load flank facing the male thread load flank, the female thread stabbing flank includes:

a first female thread stabbing flank portion located farther from the pipe axis and having a stabbing flank angle equal to the stabbing flank angle of the first male thread stabbing flank portion; and a second female thread stabbing flank portion located closer to the pipe axis and having a stabbing flank angle equal to the stabbing flank angle of the second male thread stabbing flank portion.

15. The threaded connection according to claim 14, wherein the first pin further includes a first pin shoulder surface located on the tip of the first pin, and the second pin further includes a second pin shoulder surface located on the tip of the second pin, the second pin shoulder surface being in contact with the first pin shoulder surface when the connection has been made up.

* * * * *